United States Patent
Zhang et al.

(10) Patent No.: US 10,756,524 B2
(45) Date of Patent: Aug. 25, 2020

(54) ADJUSTABLE JUNCTION BOX AND ADAPTER

(71) Applicants: Kai Zhang, Los Angeles, CA (US); Saeed Nikayin, Los Angeles, CA (US); Gilbert Loera, Los Angeles, CA (US)

(72) Inventors: Kai Zhang, Los Angeles, CA (US); Saeed Nikayin, Los Angeles, CA (US); Gilbert Loera, Los Angeles, CA (US)

(73) Assignee: Orbit Industries Inc., Los Angeles, CA (US)

( * ) Notice: Subject to any disclaimer, the term of this patent is extended or adjusted under 35 U.S.C. 154(b) by 107 days.

(21) Appl. No.: 16/202,343

(22) Filed: Nov. 28, 2018

(65) Prior Publication Data
US 2020/0169068 A1 May 28, 2020

(51) Int. Cl.
*H02G 3/08* (2006.01)
*H02G 3/12* (2006.01)

(52) U.S. Cl.
CPC ............ *H02G 3/125* (2013.01); *H02G 3/085* (2013.01)

(58) Field of Classification Search
CPC .......... H02G 3/125; H02G 3/085; H02G 3/08; H02G 3/10; H02G 3/081; H02G 3/12; H02G 3/14; H05K 5/00; H05K 5/02; H05K 5/0204
USPC .............. 174/480, 481, 50, 53, 57, 58, 503; 220/3.2–3.9, 4.02; 248/906
See application file for complete search history.

(56) References Cited

U.S. PATENT DOCUMENTS

| | | | |
|---|---|---|---|
| 2,297,862 A | 8/1939 | Bachmann | |
| 3,634,015 A | 1/1972 | Lauderback et al. | |
| 4,098,423 A | 7/1978 | Marrero | |
| 4,794,207 A | 12/1988 | Norberg et al. | |
| 5,042,673 A | 8/1991 | McShane | |
| 5,098,046 A * | 3/1992 | Webb | H02G 3/128 174/503 |
| 5,931,325 A | 8/1999 | Filipov | |
| 6,232,553 B1 * | 5/2001 | Regen | H02G 3/083 174/350 |
| 6,533,225 B1 | 3/2003 | Berges et al. | |
| 6,590,155 B2 | 7/2003 | Vrame et al. | |
| 6,820,760 B2 | 11/2004 | Wegner et al. | |
| 7,077,280 B1 | 7/2006 | Gretz | |
| 7,166,801 B1 | 1/2007 | Gretz | |
| 7,468,486 B2 | 12/2008 | Yan | |
| 7,582,829 B2 * | 9/2009 | Yan | H02G 3/0666 174/50 |
| 7,645,936 B2 * | 1/2010 | Magno, Jr. | H02G 3/14 174/50 |
| 7,935,886 B2 | 5/2011 | Jafari | |

(Continued)

*Primary Examiner* — Angel R Estrada
(74) *Attorney, Agent, or Firm* — Kirk A. Buhler; Buhler & Associates Patenting (57) ABSTRACT

Improvements in an adjustable box and adapter are disclosed for mounting a junction box directly to a stud, between studs, and to a ceiling using an adaptor and adjusting the position of said junction box. The junction box can be secured to the adaptor using screws. Longitudinal slots on the adaptor allow the adjustment of the position of the junction box along the adaptor by loosening the screws. The screws can be tightened or loosened using the screwheads or attachments on the screws, thereby allowing the adjustment of the junction box from both within the junction box and outside the junction box.

20 Claims, 5 Drawing Sheets

(56) References Cited

U.S. PATENT DOCUMENTS

| | | | |
|---|---|---|---|
| 8,403,289 B1* | 3/2013 | Rinderer | H02G 3/126 |
| | | | 174/480 |
| 9,653,899 B2* | 5/2017 | Salian | H02G 3/121 |
| 9,853,431 B2* | 12/2017 | Jones | H02G 3/126 |
| 10,056,748 B2* | 8/2018 | Thomas | H02G 3/128 |
| 2003/0066832 A1 | 4/2003 | Kipka et al. | |
| 2005/0092510 A1 | 5/2005 | Dinh | |
| 2006/0108362 A1 | 5/2006 | Lalancette | |
| 2008/0035363 A1 | 2/2008 | Yan | |
| 2008/0047729 A1 | 2/2008 | Wegner et al. | |
| 2008/0156513 A1 | 7/2008 | Johnson et al. | |
| 2008/0156514 A1 | 7/2008 | Webb | |

* cited by examiner

ADJUSTABLE JUNCTION BOX AND ADAPTER

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an adjustable box and adapter. More particularly, the adjustable box and adapter allows for adjusting the position of the junction box from both inside and outside of the junction box and provides a safety device to prevent removal of the locking fastener.

Description of Related Art Including Information Disclosed Under 37 CFR 1.97 and 1.98

When an electrical switch or outlet receptacles are mounted on a drywall, sheet rock or similar wall surface, a plaster or mud ring is secured on the junction box. Due to different finished wall thicknesses due to installation of tiles or other materials, plaster rings are used that have a protruded collar around their central opening to receive the electrical switch or outlet receptacles. The protrusions must be raised to the thickness of the finished wall surface so that the protrusion sits flush with the surrounding surface of the wall. Often the finished thickness of the wall is not known until construction or installation is completed. To combat the issue of an unknown finished wall thickness, adjustable rings on the junction box are used to allow the installer to set the thickness of the ring as required at each individual electrical switch or outlet junction box.

A number of patents and or publications have been made to address these issues. Exemplary examples of patents and or publication that try to address this/these problem(s) are identified and discussed below.

U.S. Pat. No. 6,820,760 issued on Nov. 23, 2004 and U.S. Publication Number 2008/0047729 that was published on Feb. 28, 2008, both to Wesley Gene Wegner et al., disclose an Electrical Box Extension. The extension is with screws placed on two corners of the extension box. The use of screws requires the operator to turn the screws until the desired height is achieved. For installation the time to turn the screws and to ensure that the four corners of the box is level takes a great deal of time and without positive locking positions the extension can be moved.

U.S. Pat. No. 6,533,225 issued on Mar. 18, 2003 to Jon Berges et al., discloses a Wall-Mounted Audio Control Housing and Receptacle Therefor. This patent uses a limited number of latching teeth located on the sides of the box with a living hinge that provides the engagement. This patent only discloses the receptacle for mounting an audio volume control and installation depth of the box is limited to a short travel. An operator must further depress both sides of the box to disengage the audio control housing.

U.S. Pat. No. 7,935,886 issued May 3, 2011 to Afshin Jafari discloses an Adjustable Variable Ring for Electrical Junction Boxes. This patent uses a constant spring force against a sliding insert. The spring pushes into the insert and must be depressed to release the spring force. This patent does not disclose using a sliding or rotating mechanism to actively push a lock into the electrical box.

U.S. Patent Publication Number 2005/0092510 issued on May 5, 2005 to Cong Thanh Dinh discloses an Adjustable Electrical Outlet Box Assembly. The adjustment is with a barb type friction lock that slides down one side of the electrical box. While this provides some level of adjustment, the electrical box is only supported on one side thereby allowing the electrical box to sit in an uneven configuration within the wall and because this is a barb type lock, where once the electrical box is set in the wall it can't be withdrawn.

What is needed is an adjustable box and adapter to allow an installer to adjust the position of the junction box from both inside and outside of the junction box. The adapter should prevent the installer from removing the adjustment screw and the adapter should also lock the position of the junction box from one side to prevent adjustments from the installer. The adjustable box and adapter disclosed in this document provides the solution.

BRIEF SUMMARY OF THE INVENTION

It is an object of the adjustable box and adapter to allow an installer to adjust the position of the junction box from both inside and outside of the junction box. The electrical junction box includes a bottom wall, a side wall, a cavity formed by said bottom wall and side wall, and threaded screw holes located on the side wall. The adaptor includes flanges with longitudinal slots.

It is another object of the adjustable junction box and adaptor for the junction box to be adjustably positioned from the cavity inside of the box. The hairpin(s) on the screws allow the installer to tighten and loosen the screws without requiring access to the screwheads. The hairpin provides a torsional arm that can be grasped to turn the screw to loosen the grip of the junction box from the adapter flange.

It is another object of the junction box and adaptor to securely affix the junction box to the adaptor and be securely mounted to a stud, between studs, or ceiling installation. The offset of the junction box from the adapter is adjustable to accommodate the thickness of the drywall, sheetrock, stucco or other stud covering. Once securely mounted and adjusted the stud surface covering can be applied around the junction box whereby the outer surface of the junction box is essentially flush with the surrounding finished surface of the wall.

It is another object of the junction box and adaptor for the hairpin of the setting screw to be removable. Once the hairpin is removed only the threads of the setting screw are visible and provide a limited gripping surface to loosen the setting screw. This essentially prevents any loosening of the setting screw to prevent accidental or intentional changes to the desired finish surface. Removal of the hairpin further increases the interior volume of the junction box and removes a potential for mechanical interference of the hairpin with any finished wiring within the junction box. If needed the hairpin can be re-inserted into the setting screw for future adjustments.

It is still another object of the junction box and adaptor for the adapter to prevent complete removal of the setting screw. This is accomplished by the hairpin passing completely through the setting screw. As the setting screw is loosened it will eventually be block from removal by the hairpin making contact with the interior surface of the junction box.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

ITEM NUMBERS AND DESCRIPTION 20 adjustable box and adapter
21 bar bracket
22 stud
23 outlet flange
24 finished surface
30 adapter
31 stud mounting flange
32 recessed face
33 friction tab
34 mounting tab
35 slot
36 side flange
37 friction tab
38 hole
39 center notch
40 tapped hole
50 junction box
51 screw
52 depth indicia
53 knock-out
54 tabs
60 rear position
70 setting screw
71 through hole
72 shank
80 hairpin
81 curved bend
98 turn
99 travel Adjustable electrical junction boxes are widely available, but there remains a need for electrical junction boxes that can be adjusted after the drywall has been installed and the means for adjustment are no longer accessible for adjustable electrical junction boxes installed directly to a stud, between studs, and to a ceiling.

Figure 1:
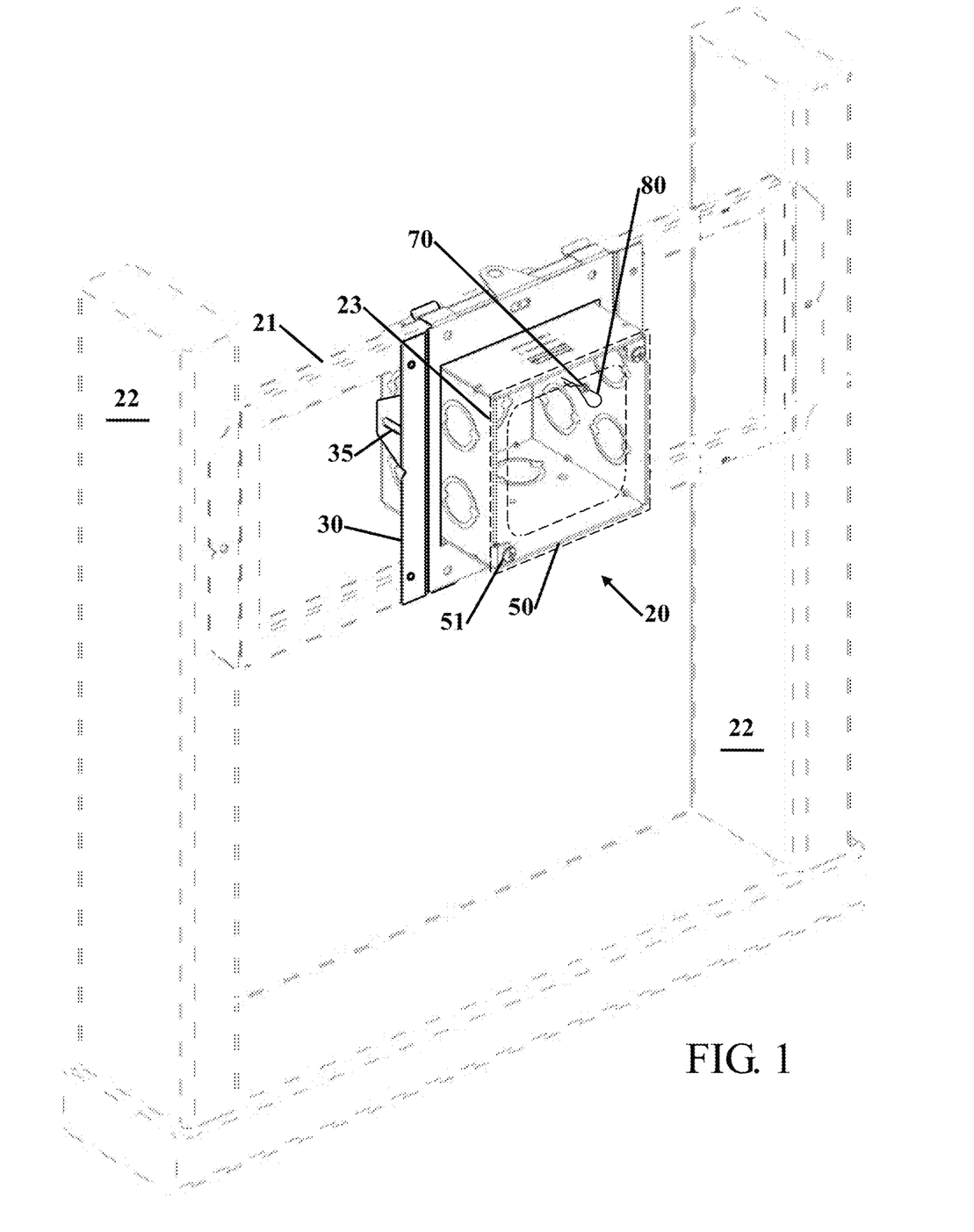
FIG. 1 shows an adjustable box and adapter mounted on an unfinished wall.

FIG. 1 shows an adjustable box and adapter 20 mounted on an unfinished wall. In this figure the adjustable box and adapter 20 is mounted onto a bar bracket 21 that spans across two vertical studs 22 in a framed wall. A mounting flange 23 is shown in broken line. The mounting flange is secured to the electrical junction box 50 with screw(s) 51. The mounting flange provides a surface for securing electrical outlets and/or switches. The adjustable box and adapter 20 have an adapter 30 mounted to a junction box 50.

To attach an electrical junction box 50 to the adaptor 30, the installer first places the junction box 50 onto the adaptor 30 and inserts screws 70 through the longitudinal slots 35 and into threaded screw holes in the junction box 50. The position of the junction box 50 can be adjusted by shifting the location of the screws 70 along the longitudinal slots 35 on the adaptor 30. To secure the position of the junction box 50 on the adaptor 30, the installer tightens the screws 70 by turning the screws' screwheads. The setting screw 70 has a hole formed through the threads of the setting screw 70. A hairpin 80 is set through the formed hole. The hairpin provides both a torsional arm to turn the screw 70 from the inside of the junction box 50 and also provides a stop to prevent the screw 70 from being unscrewed completely from the outside of the junction box 50.

Figure 2:
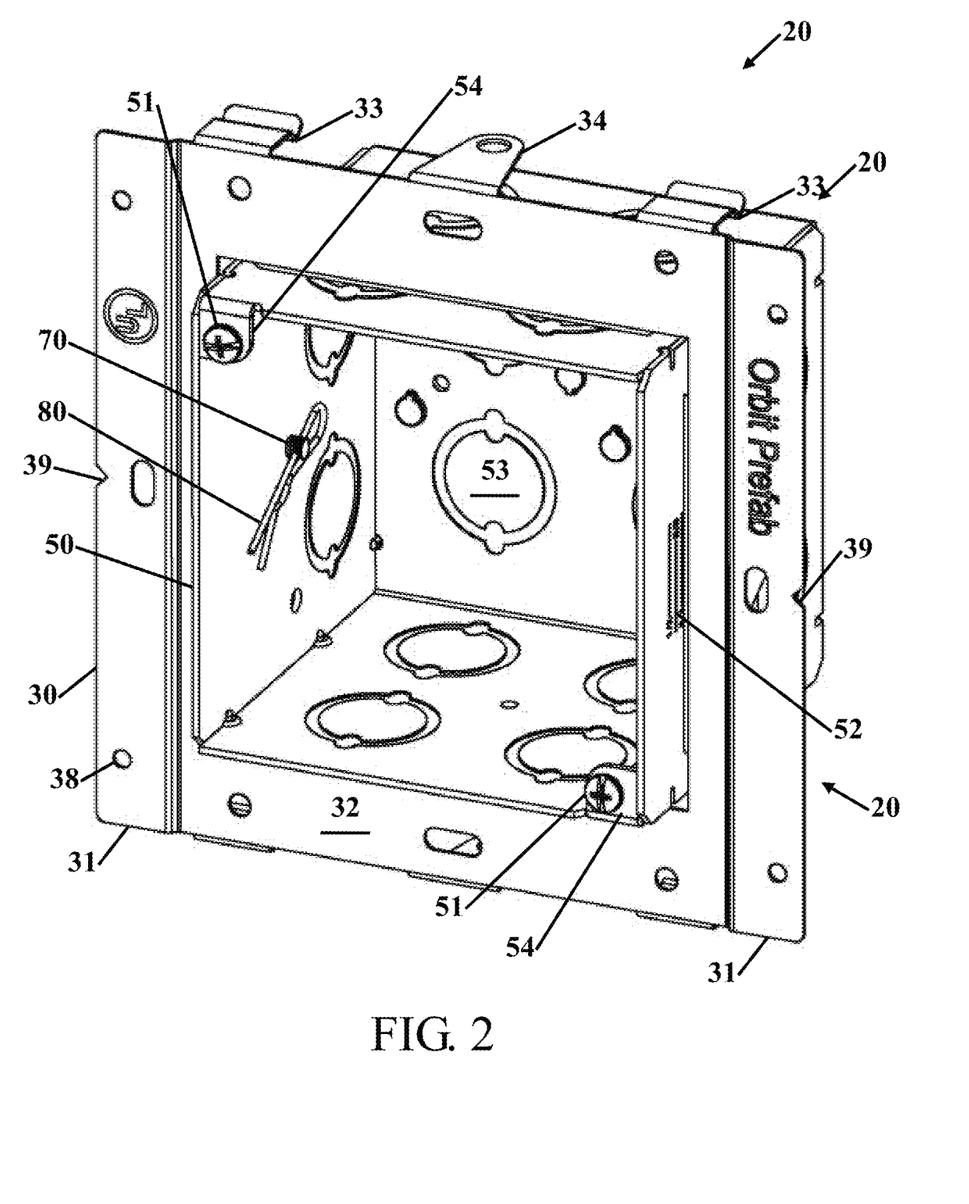
FIG. 2 shows a detailed view of the adjustable box and adapter.
Figure 3:
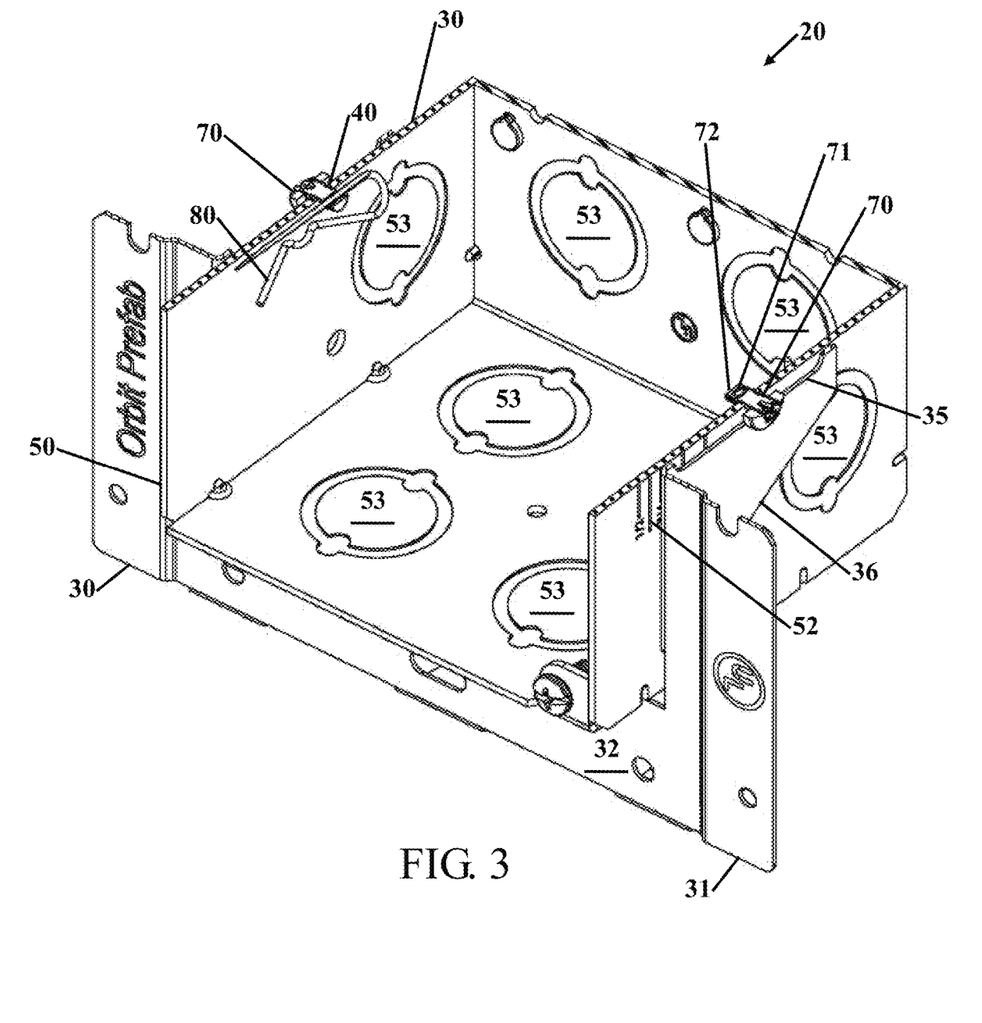
FIG. 3 shows sectional view of the adjustable box and adapter.

FIG. 2 shows a detailed view of the adjustable box and adapter 20 and FIG. 3 shows sectional view of the adjustable box and adapter 20. In this embodiment the junction box 50 is essentially rectangular with four sides that extend from a back surface. This configuration of a junction box 50 is constructed to accept two electrical outlets and/or switches. While it is shown and described to accept two electrical outlets and/or switches it should be understood by one skilled in the art that the junction box 50 can be configured to accept more or less than the two outlets and/or switches by altering the width of the junction box 50. The front face of the junction box 50 has tabs 54 that support screws 51, with only one screw is shown in this figure. The tabs 54 and screws 51 are provided to support a cover or outlet flange 23 for the switches and/or outlets (not shown). The junction box 50 has a plurality of knock-outs 53 for connecting with conduit or other hardware to pass electrical wiring to the interior of the junction box 50.

The junction box 50 is configured to be movable within the adapter 30 to adjust the depth of the junction box 50 such that the front face of the junction box 50 approximates the finished surface of a wall. The side(s) of the junction box 50 have indicia 52 to identify the drywall, sheetrock, stucco thickness or other expected wall finish. In this embodiment the indicia 52 identifies thickness of ½ inch, ⅝-inch, ¾-inch, 1 inch and 1-¼ inch. While these specific dimensions are provided other units of measure (such as metric) and thicknesses are contemplated. Screws 70 are tapped into the threads of tapped hole(s) 40 into the sides of the junction box 50. The screws 70 provide a mechanism for securing the junction box 50 onto the adapter 30.

The adapter 30 has a recessed face 32 that is recessed from two side stud mounting flanges 31. The stud mounting flanges 31 are configured to mount the adapter 30 on wall studs (as shown in FIG. 1) with fasteners placed through the holes 38. The stud mounting flanges 31 have center notches 39 that provide a height for the center position of the switch of outlet that will be later installed. On the upper and lower sides of the recess face 32 is a center mounting tab 34 with a hole and two flanges with friction tabs 33 that allow the adapter 30 to be secured onto a bar bracket 21 (as shown in FIG. 1). At the sides of the adapter 30 are side flanges 36. Each side flange 36 have slots 35 where screws 70 pass from the outside of the side flanges 36 through the slots 35 and are threaded into the junction box 50. The slots provide restricted travel of the junction box 50 on the adapter 30. Each screw 70 has a through hole 71 that passes through the shank 72 of the screw 70. The through hole 71 allow for a hairpin 80 to pass through the screw 70.

Before the drywall is installed an installer can loosen the setting screw 70 from the outside of the junction box 50 by using a screw driver on the head of the screw. Once the location of the electrical junction box 50 relative to the adapter 30 is set the setting screw 70 is usually tightened. After the drywall is installed access to the head of the screw 70 is not available. At the job, after the drywall is installed, the electrician can adjust the junction box 50 position by turning the hairpin 80 to loosen and unlock the junction box 50. The junction box 50 can now be moved to accommodate a variation in the drywall (or other wall material) and adjust the position. The hairpin 80 can then be turned to lock the position of the junction box 50 to the adapter 70 as a final position. The hairpin 80 can then be removed from the setting screw 70 before installing any wiring to increase the internal volume of the junction box 50 and reduce the possibility of electrical interference with the hairpin 80.

With this embodiment the location of the junction box 50 relative to the finished wall surface can still be adjusted by re-inserting the hairpin 80. This is particularly useful where thick wall surface treatment is added, such as tile, on top of the drywall or sheetrock.

Figure 4:
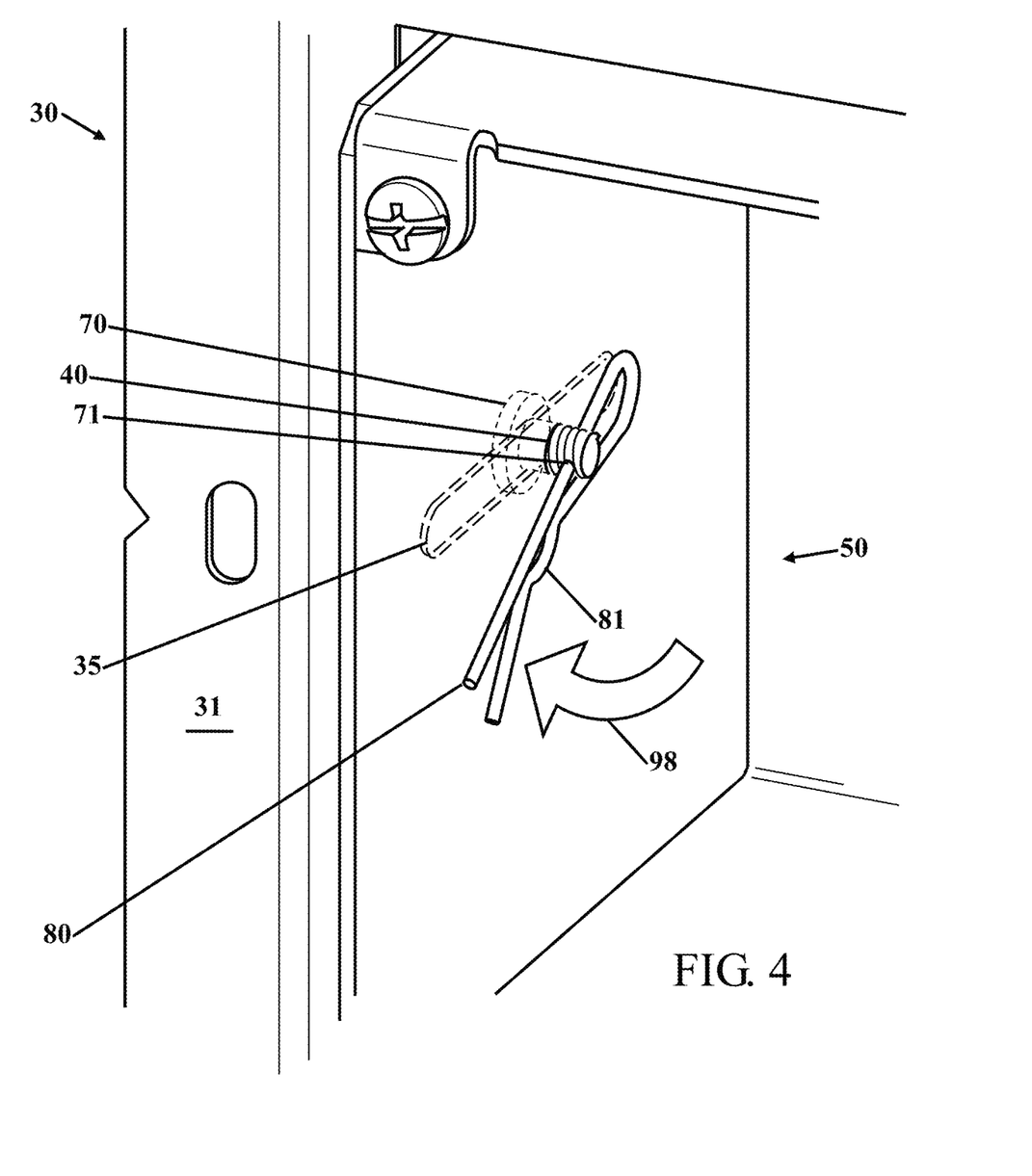
FIG. 4 shows a detailed view of the setting screw and adapter extending through the adapter and the junction box.

FIG. 4 shows a detailed view of the setting screw 70 and adapter 30 extending through the adapter 30 and the junction box 50. Some holes and knock-outs in the junction box 50 have been removed for clarity. The slot 35 is shown as broken line because it exists on the other side of the outer wall of the junction box 50. The side of the junction box 50 is extended beyond the stud mounting flange 31. The screw 70 is shown threaded into the tapped hole 40 in the junction box 50. The hair pin 80 is shown passing through the hole 71 in the screw 70. While a hairpin 80 is shown other similar devices can be used in the hole 71 including, but not limited to a cotter pin, nail, hex key shaft or wire. The hairpin 80 has at least one curved bend 81 that allows the hairpin 80 to remain in position and be held on the setting screw 70. When the hairpin 80 is installed the screw 70 can't be completely unscrewed from the junction box 50. When the hairpin 70 is removed loosening the screw 70 is significantly more difficult.

The distance between the through hole 71 and the head of the setting screw 70 is determined by the material thicknesses to the adapter 30, junction box 50, the diameter of the hairpin 80 and the optimal clearance between the adapter 30 and the junction box 50 to allow for the adapter 30 to move relative to the junction box 50. In testing the optimal clearance is between ½ and 2 pitches of the threads of the setting screw 70. This allows the user to turn 98 the hairpin about a full turn to loosen the frictional grip between the junction box 50 and the adapter 30. After positioning the junction box 50 the hairpin 80 can be turned in the opposite direction to secure the junction box 50 to the adapter 30. To change the position of the junction box 50 on the adaptor 30, the installer loosens the screws 70 by turning the screws' screwheads. If the screwheads are not accessible, the installer can fasten attachments onto the screws' threads, and turn the attachments to loosen the screws 70.

Figure 5:
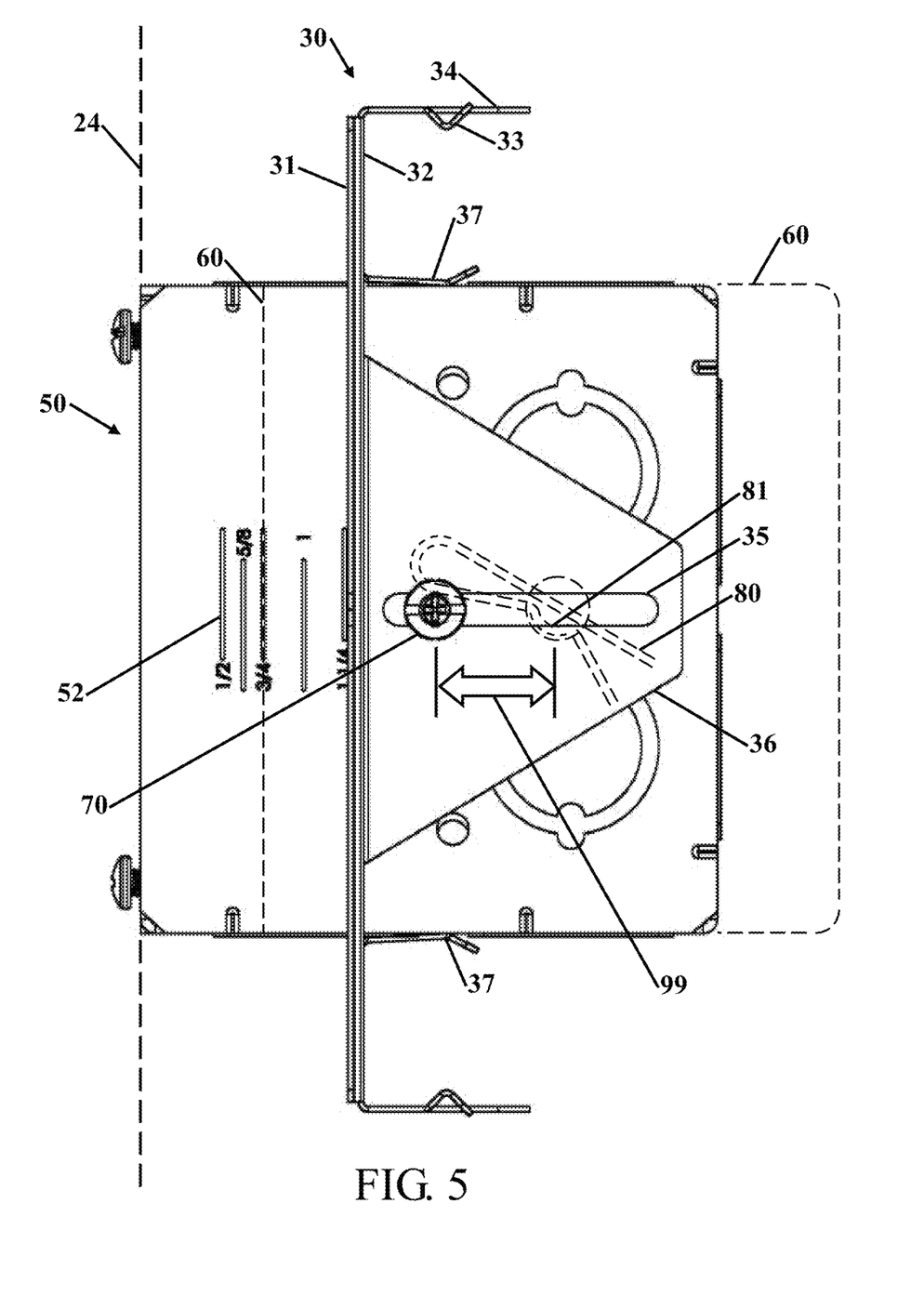
FIG. 5 shows a side view of the adjustable box and adapter.

FIG. 5 shows a side view of the adjustable junction box 50 and the adapter 30. In this figure the junction box 50 is shown in solid line against a finished wall surface 24 at the 1-¼-inch position and in broken line in the rear position 60 in the ¾-inch position marking of the indicia 52. Between these two positions the travel 99 distance of the screw 70 is shown. The travel 99 within the slot 35 in the side flange 36 extends beyond the 1-¼-inch position and the ¾-inch position relative to the front face of the stud mounting flange 31.

The mounting tab 34 and the friction tabs 33 are shown extending behind the back of the recessed face 32. Friction tabs 37 are shown on opposing sides of the junction box 50. The friction tabs both center the junction box 50 and provide some resistance to moving the junction box 50 within the adapter 30. The hairpin 80 is shown in broken line inside of the junction box 50. The curved bend 81 is shown bending around a portion of the threaded surface of the shank of the setting screw 70.

While the figures show an electrical junction box that accommodates two sets of outlets or switches it should be understood that the adjustable box and adapter 20 can be fabricated for a single outlet or switch to an adjustable box and adapter 20 that can accommodate more than two outlets or switches by increasing the width of the adjustable box and adapter 20. The box 50 can also be fabricated in shapes that are not rectangular, like round or hexagonal that is often used for recessed lighting and fan boxes. While this disclosure shows a hairpin 80 through the threads of the screw it is contemplated that the end of the screw that opposes the screwhead can have an additional driving head or socket, the addition of a driving head or socket allows for easier adjustment from inside of the junction box 50 but does not prevent removal of the setting screw 70.

Thus, specific embodiments of an adjustable box and adapter have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An adjustable box and adapter comprising:
    an adapter having a stud mounting surface;
    a pair of opposing side flanges extending from said stud mounting surface;
    said side flanges each having an elongated slot;
    said elongated slots having clearance for threads of a fastener;
    said fastener having a head on a first side and a shank that is configured to pass through said elongated slot;
    a junction box having tapped holes in each side that are configured for said fastener to thread into;
    said fastener having a through hole that passes through said shank;

a pin with a diameter that passes through said through hole such that said fastener is configured to tighten and loosen said side flanges onto said junction box from inside and outside of said junction box.

2. The adjustable box and adapter according to claim 1, wherein said fastener is tightened and loosened from said outside of said junction box by turning said head.

3. The adjustable box and adapter according to claim 1, wherein said fastener is tightened and loosened from said inside of said junction box by turning said pin.

4. The adjustable box and adapter according to claim 1, wherein said pin is removable from said fastener.

5. The adjustable box and adapter according to claim 1, wherein said pin is selected from a group consisting of a hairpin, a cotter pin, a wire, a nail and a hex wrench.

6. The adjustable box and adapter according to claim 1, wherein removal of said pin from said through hole reduces a mechanical advantage to turn said fastener from said inside of said junction box.

7. The adjustable box and adapter according to claim 1, wherein with said pin installed on said fastener said fastener is prevented from being removed from said junction box.

8. The adjustable box and adapter according to claim 1, wherein said junction box has indicia that identifies a sheet thickness dimension from said stud mounting surface.

9. The adjustable box and adapter according to claim 1, wherein said stud mounting surface further includes flanges that are configured to mount said adapter to a bar bracket.

10. The adjustable box and adapter according to claim 1, wherein said stud mounting surface further includes center line notches or indicia.

11. The adjustable box and adapter according to claim 1, wherein a distance from an underside of said fastener to said through hole is a function of a material thicknesses to said adapter 30, a material thickness of said junction box, a diameter of said pin and a clearance between said adapter and said junction box.

12. The adjustable box and adapter according to claim 11, wherein said clearance is between ½ and 2 pitches of threads of said fastener.

13. The adjustable box and adapter according to claim 1, wherein said elongated slot is configured to accept a travel of said fastener in said elongated slot of at least one inch.

14. The adjustable box and adapter according to claim 1, wherein said junction box further includes at least two electrical knock-outs.

15. The adjustable box and adapter according to claim 1, wherein said junction box further includes mounting features to accept a mounting flange for an electrical device.

16. The adjustable box and adapter according to claim 1, wherein said adapter further includes at least two friction tabs that are configured to maintain a position of said junction box within said adapter.

17. The adjustable box and adapter according to claim 1, wherein said pin has a curved bend that retains said pin on said fastener.

18. The adjustable box and adapter according to claim 1, wherein insertion of said pin into said through hole allows adjustment of said junction box relative to said adapter after a finished wall is installed over said stud mounting surface.

19. The adjustable box and adapter according to claim 1, wherein said pin provides a torsion arm to said fastener.

20. The adjustable box and adapter according to claim 1, wherein removal of said pin from said through hole increases interior volume of said junction box and eliminated interference of said pin with wiring in said junction box.

* * * * *